July 13, 1937.  V. W. KLIESRATH  2,086,560
CLUTCH MECHANISM
Filed Nov. 30, 1932   3 Sheets-Sheet 1

INVENTOR.
VICTOR W. KLIESRATH
BY H. O. Clayton
ATTORNEY

INVENTOR.
VICTOR W. KLIESRATH
BY H. Q. Clayton
ATTORNEY

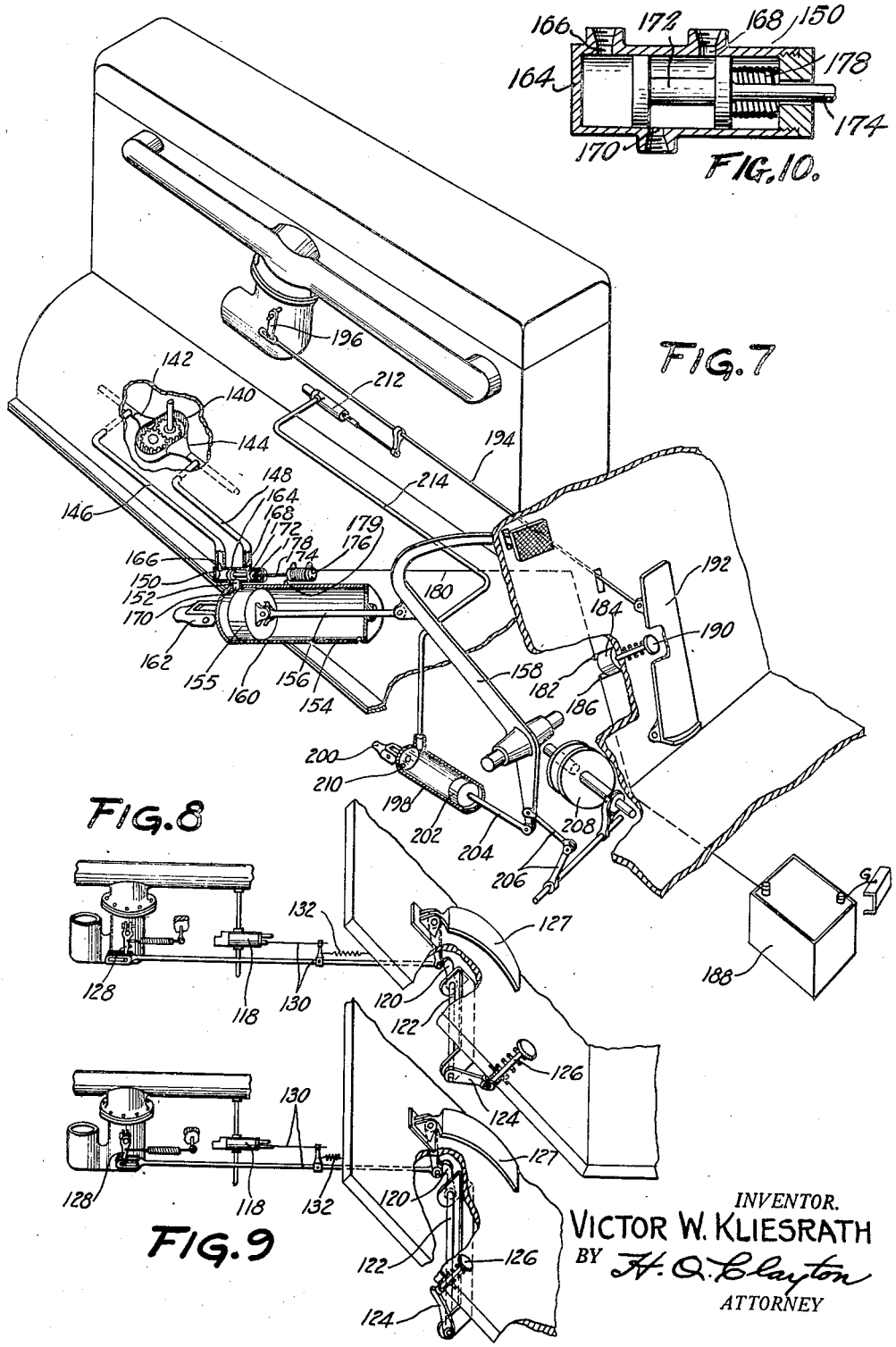

Patented July 13, 1937

2,086,560

UNITED STATES PATENT OFFICE 2,086,560

CLUTCH MECHANISM

Victor W. Kliesrath, South Bend, Ind., assignor to Bendix Aviation Corporation, South Bend, Ind., a corporation of Delaware Application November 30, 1932, Serial No. 645,103

1 Claim. (Cl. 192—.01)

This invention relates in general to the throttle, brake and clutch control mechanisms of an automotive vehicle, and in particular to means for facilitating the operation of said controls to the end that both a minimum of skill and a minimum of physical effort is necessary in the operation of said controls.

It is accordingly an object of the invention to provide power means for operating both the clutch and brakes, said power means to be controlled by manually operable pedals conveniently located adjacent the conventional brake and clutch pedals in the driving compartment of the vehicle. In a preferred embodiment there is suggested the use of a miniature pedal for controlling the power brake operating means, said pedal being placed immediately to the left of the conventional clutch pedal and to be operated by the left foot of the driver. Cooperating with such a brake operating pedal there is provided a conventional accelerator pedal operable by the right foot of the driver, the same to control both the engine throttle and power means for operating the clutch. There are thus provided two pedals, placed to the right and left of the conventional brake and clutch pedals and operable with a minimum of physical effort to control three of the major controls of the vehicle, namely, the throttle, clutch and brakes. The conventional brake and clutch pedals are preferably left intact in the driving compartment and are, of course, available in an emergency to operate the clutch and brakes, should the power means fail.

A further object of the invention is to provide an economical means for operating either the clutch or brakes by power, utilizing the internal-combustion engine of the vehicle as a prime mover, and to this end there is suggested either one of two equally effective power means, namely, an engine operated hydraulic power means and an engine operated vacuum power means. The vacuum power means may comprise an actuator in fluid transmitting connection with the intake manifold of the engine, the power element of the actuator being operably connected to either the clutch or brakes, the actuator being controlled by a manually operable three-way valve means. The hydraulic power means preferably comprises a fluid pump drivably connected to the engine crankshaft and operative to energize a so-called power actuator, the latter being operably connected to the clutch mechanism of the automotive vehicle. In one suggested arrangement the throttle operating accelerator pedal is also operative to actuate a switch, the latter controlling a solenoid operated control valve for the actuator, such that with complete release of the accelerator the suction side of the aforementioned fluid pump is placed in circuit with the actuator to energize the same and effect a disengagement of the clutch, and with depression of the accelerator the control valve is operated to place the pressure side of the fluid pump in circuit with the actuator to again energize the same to engage the clutch.

Yet another object of the invention is to provide means, operable in conjunction with said power means, for controlling the engagement of the clutch to accurately simulate the corresponding manual control of the clutch.

Another object of the invention is to provide manually operable pedal means for selectively controlling the power means for operating the clutch, and to this end there is suggested a supplemental pedal or button, operable by the left foot of the driver and operative as a stop to either cut in or cut out the accelerator pedal operation of the power means.

Yet another object is to so construct the aforementioned throttle and clutch operating accelerator pedal that both the toe and heel portions thereof are constructed and arranged to control the operation of the clutch operating power means.

Other objects of the invention and desirable details of construction will become apparent from the detailed description of the preferred embodiments of the invention described in the specification to follow and disclosed in the accompanying drawings, in which:

Figure 1 is a diagrammatic view of the several speed controlling mechanisms constituting the present invention;

Figure 1A discloses a modified form of accelerator pedal construction for controlling the throttle and power means for operating the clutch;

Figure 7 is a diagrammatic view, in perspective, of one form of power means for operating the clutch;

Figure 11:
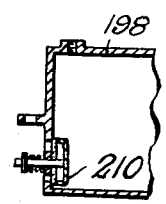

Figure 8 discloses one form of manually operable means for controlling the throttle and power means for operating the clutch;

Figure 9 discloses a modified form of the control means of Figure 8;

Figure 10 is a sectional view on an enlarged scale of the valve mechanism indicated at 150 in Figure 7; and Figure 11 is a sectional view on an enlarged scale of a portion of the dashpot 202 shown in Figure 7.

Figure 1B:
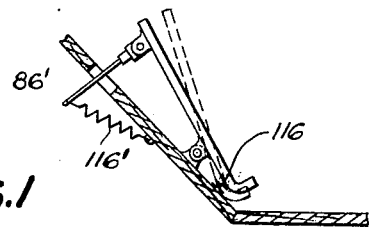
Figure 1B is a further modified arrangement of the accelerator and its connections with the throttle and control valve of the power means.
Figure 1:
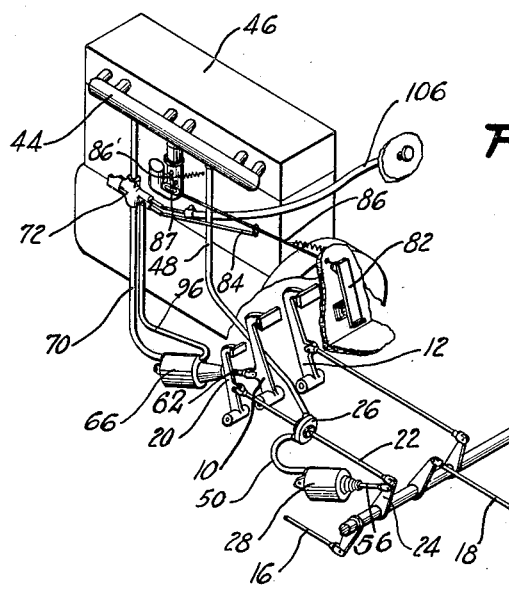

There is disclosed in Figure 1 of the drawings a diagrammatic view of the arrangement of the several speed controlling mechanisms constituting the invention wherein there are provided conventional clutch and brake pedals 10 and 12, the latter being connected to the usual cross shaft 14 operably connected to front and rear brake mechanisms, not shown, by links 16 and 18.

Figure 5:
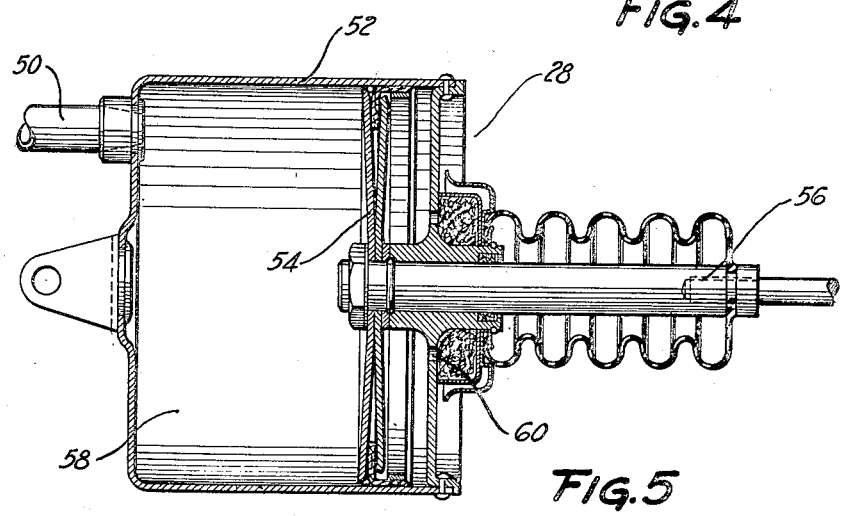
Figure 5 is a longitudinal sectional view of the brake operating power actuator.
Figure 6:
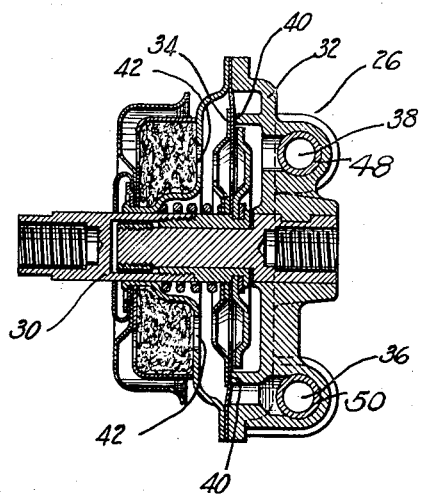
Figure 6 is a sectional view of the control valve for the power brake operating mechanism.

The particular feature of the invention resides in the arrangement of the control means for operating the clutch and brake of the vehicle by power with respect to the conventional brake and clutch pedals, and to this end there is suggested the provision of a miniature power controlling brake pedal 20, operably connected by a link 22 and arm 24 to the cross shaft 14. A control valve 26 for a vacuum operated power actuator 28 is incorporated in the link 22, said valve being disclosed in detail in Figure 6 of the drawings. This valve structure preferably comprises in general two relatively moveable parts, a sleeve portion 30 connected to the pedal 20 through the medium of a portion of the link 22 and a casing portion 32 connected to the remaining part of the link 22. A three-part orificed diaphragm 34, secured at its outer periphery to the casing 32 and at its inner periphery to the sleeve 30, serves to intercommunicate manifold and actuator ports 38 and 36, respectively, in the casing with the diaphragm unseated from a seat 40 on the casing and to intercommunicate the actuator port 36 in the casing with atmospheric openings 42 when the diaphragm is seated upon seat 40. Manifold port 38 in the valve casing is connected with an intake manifold 44 of the internal-combustion engine 46 of the vehicle by means of a conduit 48, and the actuator port 36 of the valve is connected by a conduit 50 with one end of the brake operating power actuator 28. The latter, which is disclosed in detail in Figure 5, comprises a casing 52 housing a reciprocable piston member 54, the latter being operably connected to the arm 24 on the cross shaft 14 by means of a connecting rod 56.

In operation, depression of the miniature pedal 20 to operate the brake serves, first, to operate the diaphragm parts of the valve to close off communication between the atmosphere and the actuator conduit 50, and thereafter the diaphragm is moved to be unseated from the casing at its seat 40 to thereby intercommunicate the manifold with the power actuator via the conduit 48, ports 38 and 36 and conduit 50. At closed throttle a vacuum of some twenty inches of mercury is created in the intake manifold by virtue of the pumping action of the engine pistons, and this subatmospheric pressure within the manifold is accordingly utilized to evacuate a left compartment 58 of the power actuator 28, the atmosphere admitted through opening 60 acting on the piston to move the latter to the left to operate the brakes. Should the pedal 20 be held in a partially applied position, the moving piston 54 of the actuator connected with the valve casing 32 serves to move the latter to again seat the casing at 40 upon the diaphragm 34 to cut off the communication with the manifold and hold the brakes applied by power.

The aforementioned power mechanism for applying the brakes has been only briefly described, inasmuch as the same forms no part of the instant invention, having been described and claimed in an application of Caleb S. Bragg and Victor W. Kliesrath, No. 163,351, filed January 25, 1927. The feature to be stressed in the aforementioned mechanism is the positioning of the miniature power brake operating pedal 20 immediately to the left of the conventional clutch pedal 10 where the miniature pedal may be conveniently operated by the left foot of the driver in conjunction with the accelerator pedal, the latter to control the clutch and throttle as will now be described.

Figure 2:
Figure 2 is a longitudinal sectional view of the three-way control valve structure of the clutch and brake vacuum operated power means.
Figure 4:
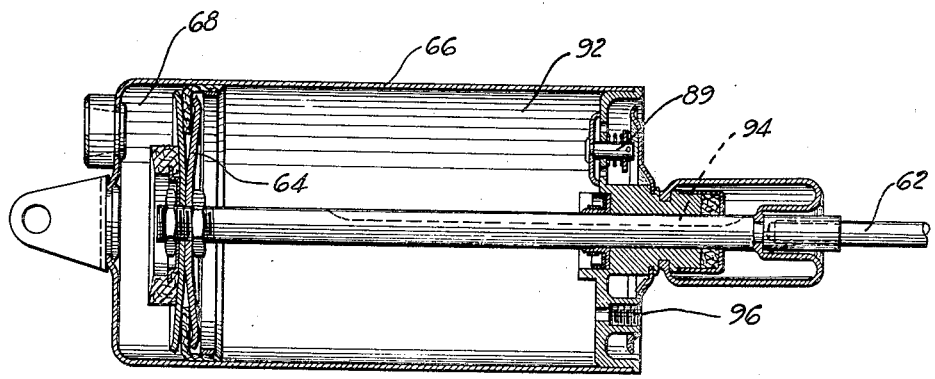
Figure 4 is a longitudinal sectional view of the clutch operating power actuator.

To the clutch pedal 10 there is secured a connecting rod 62 of a reciprocable piston 64 of a vacuum operated power actuator 66, disclosed in detail in Figure 4. The actuator is adapted to be energized or evacuated to disengage the clutch by evacuating a left compartment 68 thereof, the latter being in fluid transmitting communication with the intake manifold 44 of the internal-combustion engine by means of a conduit 70. A three-way control valve 72, disclosed in detail in Figure 2, is interposed in the conduit 70 and serves to alternately place the left compartment 68 of the actuator 66 in communication with the manifold and with the atmosphere to energize and deenergize the actuator to effect the disengagement and engagement of the clutch. The control valve preferably comprises a casing member 74, provided with manifold and actuator ports 76 and 78, respectively, and further comprises a reciprocable valve plunger member 80 operably connected to an accelerator pedal 82 by means of a link 84 which is spring returned, the latter connected to a throttle link 86. The link 86 is preferably connected to a spring returned throttle valve 86' by means of a lost motion connection 87. Such a construction provides for an operation of the control valve 72 before the throttle is opened and after the same is closed.

The valve piston 80 is provided with a reduced portion 88 to intercommunicate the manifold with the actuator when the accelerator pedal is in its fully retracted position. With the valve in this position the clutch is disengaged when the engine is idling to create a vacuum in the manifold. Air is evacuated from the compartment 68 and atmosphere is admitted, via a check valve 89, to move the piston 66 to the left to disengage the clutch.

Figure 3:
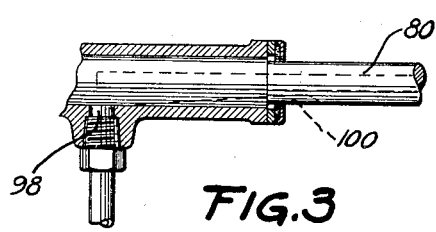
Figure 3 is a fragmentary sectional view of the clutch valve means, the section being taken on line 3—3 of Figure 2.

When it is desired to reengage the clutch, the accelerator is depressed, thereby placing an atmospheric slot 90 in the valve piston in communication with the actuator port 78 of the valve to vent the actuator to atmosphere and effect an engagement of the clutch. This engagement is accomplished in two distinct stages of movement of the actuator piston 64, the first stage, to bring the clutch plates into engagement, being relatively rapid due to the efflux of air from a right compartment 92 of the actuator via a slot 94 in the piston rod 62. When the slot 94 is covered by the end wall of the actuator, the second or clutch plate contacting stage of movement of the clutch pedal is initiated, this movement being controlled by the rate of efflux of air via a bleed conduit 96 terminating in a controlled port 98, the rate of efflux of air via said port 98 being determined by the depth of a slot 100, Figure 3, in the plunger 80. Thus the position of the accelerator pedal determines the rate of movement of the clutch pedal during the aforementioned second or clutch plate contacting stage of movement. A cut-out valve is provided to render the power mechanism inoperative, the same comprising a piston member 102 provided with a recessed portion 104 to intercommunicate the manifold and actuator and also operable, when the piston 102 is moved to the left, preferably by means of a Bowden control 106 operable from the dash, to place an atmospheric slot 108 in the plunger in communication with the actuator via actuator port 78 and conduit 70. Thus when the operator desires to render the power mechanism for operating the clutch inoperative, he moves the piston 102 to the left to permanently vent the clutch actuator.

From the above described mechanism it will be observed that both the clutch and brakes are operated by vacuum operated power means, the clutch being disengaged by power with release of the accelerator pedal and reengaged with depression of the accelerator pedal. The brake is operated by power with the operation of the miniature pedal 20. The two pedals 20 and 82 accordingly provide means operable by the left and right feet of the driver, respectively, the same being conveniently positioned to the left and right of the conventional clutch and brake pedals 10 and 12, said pedals 20 and 82 completely controlling, with a minimum of physical effort on the part of the operator, the clutch, brake and throttle of the vehicle. Should the power mechanism for the clutch and brake be rendered inoperative for any reason the conventional clutch and brake pedals may be operated in the usual manner.

Figure 1A:
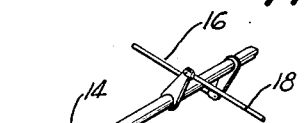

There is disclosed in Figure 1A a modified construction of accelerator pedal, a heel portion 110 being provided with a return spring 112 positioned thereunder. The accelerator pedal is, under ordinary circumstances, returned to its throttle cut off and valve operating position by a return spring 114. Should this return spring be rendered inoperative for any reason the control valve for the clutch actuator may nevertheless be operated to disengage the clutch by depressing the heel portion of the accelerator.

There is also suggested another arrangement of the parts in Figure 1B whereby the accelerator in its completely released position, under the action of a return spring 116, serves merely to permit a closing of the throttle lever 86' by a spring 116', weaker than spring 116, without, however, operating the control valve. Should the operator then desire to operate the clutch operating control valve to disengage the clutch, he would depress the spring returned heel portion of the accelerator to the dotted line position disclosed, the lost motion connection 87 permitting this operation.

There is disclosed in Figure 8 stop means, cooperating with the throttle operating means, to control a clutch control valve 118 similar to the valve 72 of Figure 1. This stop structure preferably comprises a crank 120 operably connected by interconnected links 122 and 124 to a spring operated pedal member 126. An accelerator 127 is connected to the valve 118 and a spring operated throttle lever 128 by linkage 130, said linkage being urged to the right, to permit a closing of the throttle and to operate the valve 118, by a spring 132. In the off position of the parts the spring returned pedal 126 serves to operate the crank 120 to limit the throw of a throttle and valve operating link members 130 so that the throttle 128 is closed, under the action of its spring, without, however, operating the valve 118 to effect a disengagement of the clutch. When it is desired to effect a clutch disengaging operation of the valve 118, the driver depresses the pedal 126 with his left foot, thus permitting the accelerator 127 to be completely released under the action of the spring 132 to operate the valve 118. The stop mechanism thus operates as a means to "cut in" the operation of the clutch control valve.

In Figure 9 the mechanism of Figure 8 is adjusted to function as a "cut out" means whereby with depression of the pedal 126 by the left foot of the driver the parts assume the position of the parts in Figure 8, and the operation of the control valve 118 by the throttle linkage 130 to effect a disengagement of the clutch is obviated. In order to obtain this result the crank 124 is positioned to be rotated counterclockwise as distinguished from the clockwise rotation of the same in the arrangement of Figure 8, and in the off position of the parts the valve 118 is operated by the return spring 132 to effect the disengagement of the clutch.

In Figure 7 there is disclosed power means for both positively engaging and disengaging the clutch, said means differing from the vacuum operated mechanism of Figure 1 in that the latter only positively disengages the clutch, the engagement being effected by means of the conventional clutch spring.

Describing in detail the construction of the power means of Figure 7, there is provided an oil pump 140, which may also serve as the pump of the force feed lubricating system of the engine. The discharge and intake sides 142 and 144 of the pump 140 are connected respectively by conduits 146 and 148 with a control valve 150, the latter being connected by a conduit 152 with the fluid receiving end of a clutch operating actuator or fluid motor 154. A reciprocable piston or power element 155 of the fluid motor is connected by means of a rod 156 with a conventional clutch pedal 158. A cylinder or body portion 160 of the motor is preferably pivotally secured by a connection 162 with a portion of the chassis, not shown. The control valve 150 comprises a cylinder 164 having ports 166, 168 and 170, and further comprises a reciprocable spool-shaped piston member 172 operably connected by a rod 174 with a solenoid 176, the latter being preferably mounted on the actuator cylinder 160. A spring 178 is interposed between one end of the valve cylinder and one end of the valve piston. The solenoid 176 is of conventional design and is provided with leads 179 and 180, the former being connected to the cylinder 160 to provide a ground and the latter being connected to one contact 182 of a switch 184, the remaining contact 186 being connected to a source of current such as a battery 188. The switch further comprises a spring operated plunger 190, positioned immediately beneath an accelerator 192, the latter connected by a rod 194 with a conventional carburetor operating lever 196. The connection between the rod 194 and lever 196 provides for a certain amount of lost motion in order that the switch may be operated before and after the opening and closing of the throttle, respectively. The switch 184 is thus operative to control the operation of the clutch motor 154 during the final and initial increments of movement of the accelerator pedal.

The construction of the clutch operating power means is completed by a dashpot cylinder 198 secured to the chassis by a bracket 200, a reciprocable piston 202 of the dashpot being connected by a rod 204 with the clutch pedal 158, the latter being connected by linkage 206 with conventional friction elements of a clutch 208. The influx of air to the dashpot during the disengagement of the clutch is permitted by a check valve 210, and the efflux of air therefrom is regulated, to control the mode of clutch engaging movement of the clutch pedal, by means of an accelerator operated bleed valve 212 in fluid transmitting connection with the dashpot cylinder 198 by means of a conduit 214. The construction of the bleed valve is identical with that of the mechanism of Figure 1, said valve being disclosed in detail in Figure 3.

In operation, with the accelerator released and the engine idling the switch 184 is arranged to be closed by its spring to thereby energize the solenoid 176. The valve piston 172 is accordingly moved to the right, to the position disclosed in Figure 7, to intercommunicate the suction side of the pump 140 with the clutch operating fluid motor and effect an evacuation of the liquid from the motor to disengage the clutch. With operation of the accelerator to increase the engine speed the switch plunger 190 is depressed to open the switch, thus deenergizing the solenoid and permitting the valve spring 178 to move the valve member 172 to the left to intercommunicate the pressure side of the pump with the motor and positively engage the clutch. The rate of clutch engaging movement of the clutch pedal, under the action of the power fluid, is determined by the rate of efflux of air from the dashpot 198, said rate, in turn, being determined by the degree of opening of the bleed valve by the accelerator, all as described in explaining the operation of the mechanism of Figure 1.

There is thus provided an accelerator controlled hydraulically operated power means for both positively disengaging and engaging the clutch, the initiating of the clutch disengaging and engaging operations of the power means being effected by the operation of valve means controlled by the accelerator and the rate of engagement of the clutch being a function of the mode of operation of the accelerator through the medium of the bleed valve.

Although this invention has been described in connection with certain specific embodiments, the principles involved are susceptible of numerous other applications that will readily occur to persons skilled in the art. The invention is, therefore, to be limited only as indicated by the scope of the appended claim. The mechanisms disclosed in Figures 7, 8 and 9 are not claimed herein, inasmuch as the same are covered by my divisional applications Serial Nos. 137,416 and 137,417, filed April 17, 1937.

I claim:

In an automotive vehicle provided with a throttle and a clutch, power means for operating the clutch including a control valve and a common manually operable member for controlling the operation of both the throttle and control valve of the power means, said manually operable member comprising a treadle pivotally mounted at a point intermediate its ends, a spring acting on said treadle to move the same to a position to completely close the throttle and operate said control valve to effect a disengagement of the clutch, and other spring means acting on said treadle and operative to position the same as indicated above after a heel operation of said treadle, made necessary by a failure of the first mentioned spring means.

VICTOR W. KLIESRATH.